UNITED STATES PATENT OFFICE.

RICHARD S. WARING, OF PITTSBURG, PENNSYLVANIA.

INSULATING COMPOUND FOR ELECTRIC WIRES.

SPECIFICATION forming part of Reissued Letters Patent No. 10,351, dated July 3, 1883.

Original No. 267,046, dated November 7, 1882. Application for reissue filed June 2, 1883.

*To all whom it may concern:*

Be it known that I, RICHARD S. WARING, a citizen of the United States, residing at Pittsburg, Allegheny county, Pennsylvania, have invented certain new and useful Improvements in Insulating Compounds for Electric Wires, of which the following is a specification.

My invention relates to a composition of matter for the insulation of telegraph and other electrical wires; and my invention consists in utilizing the fluid distillate products or the residuum of petroleum, combined with resins, gums, and natural or artificial bitumen or asphaltum, and with corpus matter—such as clay, chalk, pulp, or like material—which will readily combine with the fluid portion of the compound without impairing its efficiency as an insulating medium.

In distilling petroleum or other mineral oil, after taking off the distillates of low gravity—such as naphtha and illuminating-oils—heavier compounds remain in the still, which are capable of being divided into numerous other products by carrying on the process of distillation. Among these products which are carried over in the further distillation are some which remain fluid when cold, and others which congeal or become hard when cold. The products above referred to which are fluid when cold are the ones used in the manufacture of my improved insulating compound, combined with natural asphaltum, pitch, rosin, or coal-tar pitch, or with the distillates of petroleum which are solid when cold. I take of the fluid distillates above mentioned any desired quantity, and add thereto the rosin, asphaltum, pitch, or the solid residuum of petroleum in sufficient quantity to make a somewhat thick mass. These are thoroughly mixed by heating or by mechanical means, so as to produce a homogeneous mass. The corpus matters—such as clay, chalk, pulp, or other suitable material—are added until the composition is of the proper consistency to adhere to and form a body of substantial thickness on the wire or cable to be coated. The clay, chalk, or other like material acts not only as an absorbent to take up the resinous elements of the distillates and bitumens, and prevent them from making the compound tacky or sticky, but they also act to retain the lighter or volatile portions of the distillates or bitumen, and thus prevent the compound, when applied, from becoming dry and brittle. The wire, which has been previously coated or covered with a cotton or other fibrous or textile material, when divested of its moisture by means of devices and processes which form the subject-matter of other applications, is drawn through the compound in such a manner as to saturate the fibrous coating of the wire, and to form a substantial body of the composition thereon, and after the coating has become hard or sufficiently set it is wound up in coils or on reels in the usual manner.

In order to effect a speedy drying of the compound after it is applied to the wires, and to facilitate the further manipulation of the same without annoyance to the workmen, and to prevent the coils from adhering to each other in case the composition is too liquid, I may draw the coated wire through a body of finely-disintegrated asbestus, mineral paint, or other like and suitable material which will not harden or become brittle, and thus the wires will be so coated that they will not be so readily affected by heat or moisture, and may be colored to give a fine appearance suitable to the color of the wall on which they may be suspended.

Having thus described my invention, what I claim is—

1. The compound herein described for insulating telegraph and other electrical wires, the same consisting in the liquid distillates of petroleum, such as described, combined with resinous or bituminous substances, and with clay, chalk, pulp, or other suitable material.

2. The compound herein described for insulating telegraph and other electrical wires, the same consisting of a liquid product of petroleum distillation, thickened with corpus or earthy matter to increase its consistency and absorb the volatile portions, substantially as described.

3. An electric-wire coating consisting of a product of petroleum distillation thickened with an earthy absorbent, and covered exteriorly with mineral paint or its described equivalent, substantially as set forth.

4. An electric insulating material consisting of a heavy product of petroleum, combined with an absorbent substance, substantially as and for the purposes set forth.

5. An electric insulating material consisting of a mixture of liquid and solid products of petroleum distillation and an earthy absorbent, substantially as set forth.

In testimony whereof I have hereunto set my hand.

RICHARD S. WARING.

Witnesses:
R. H. WHITTLESEY,
C. L. PARKER.